United States Patent
Rhee et al.

(10) Patent No.: US 9,304,194 B2
(45) Date of Patent: Apr. 5, 2016

(54) APPARATUS AND METHOD FOR ESTIMATING CAMERA MOTION USING DEPTH INFORMATION, AND AUGMENTED REALITY SYSTEM

(75) Inventors: Seon Min Rhee, Seoul (KR); Yong Beom Lee, Seoul (KR); Sang Wook Kim, Seoul (KR); Kyung Hwan Kim, Yongin-si (KR); Do Kyoon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 664 days.

(21) Appl. No.: 13/353,767

(22) Filed: Jan. 19, 2012

(65) Prior Publication Data

US 2012/0236119 A1    Sep. 20, 2012

Related U.S. Application Data

(60) Provisional application No. 61/434,597, filed on Jan. 20, 2011.

(30) Foreign Application Priority Data

Feb. 21, 2011  (KR) .................. 10-2011-0015099
Apr. 7, 2011   (KR) .................. 10-2011-0032162

(51) Int. Cl.
*G01S 11/00*   (2006.01)
*G01S 11/12*   (2006.01)
(Continued)

(52) U.S. Cl.
CPC .............. *G01S 11/12* (2013.01); *G01S 3/7864* (2013.01); *G06T 7/2033* (2013.01); *G06T 2207/10028* (2013.01); *G06T 2207/30244* (2013.01)

(58) Field of Classification Search
CPC .......... H04N 13/0239; H04N 13/0055; H04N 13/0296; H04N 13/0497; H04N 13/0242
USPC ............................................. 348/46
See application file for complete search history.

(56) References Cited

U.S. PATENT DOCUMENTS

2008/0212836 A1 * 9/2008 Fujimura et al. .............. 382/103
2010/0034427 A1    2/2010 Fujimura et al.
(Continued)

FOREIGN PATENT DOCUMENTS

JP    2006-215924 A    8/2006
JP    2007-514211 A    5/2007
(Continued)

OTHER PUBLICATIONS

Seon-Yeong et al "3D Depth Estimation for Target Region using Optical Flow and Mean-Shift Algorithm" International Conference on Control, Automation and Systems 2008.*
(Continued)

*Primary Examiner* — Jayanti K Patel
*Assistant Examiner* — Frank Huang
(74) *Attorney, Agent, or Firm* — NSIP Law

(57) ABSTRACT

Provided is a camera motion estimation method and apparatus that may estimate a motion of a depth camera in real time. The camera motion estimation apparatus may extract an intersection point from plane information of a depth image, calculate a feature point associated with each of planes included in the plane information using the extracted intersection point, and extract a motion of a depth camera providing the depth image using the feature point. Accordingly, in an environment where an illumination environment dynamically varies, or regardless of a texture state within a space, the camera motion estimation apparatus may estimate a camera motion.

24 Claims, 13 Drawing Sheets

(51) Int. Cl.
*G01S 3/786* (2006.01)
*G06T 7/20* (2006.01)

(56) References Cited

U.S. PATENT DOCUMENTS

| | | | |
|---|---|---|---|
| 2010/0053416 | A1 | 3/2010 | Chen et al. |
| 2010/0277470 | A1 | 11/2010 | Margolis |
| 2011/0169861 | A1* | 7/2011 | Suzuki et al. ................. 345/632 |

FOREIGN PATENT DOCUMENTS

| | | |
|---|---|---|
| JP | 2008-067315 | 3/2008 |
| JP | 2008-153741 | 7/2008 |
| KR | 10-0965348 | 10/2005 |
| KR | 10-2008-0105698 | 12/2008 |
| KR | 10-2010-0019927 | 2/2010 |
| KR | 10-2010-0090401 | 8/2010 |

OTHER PUBLICATIONS

Kato et al. Marker Tracking and HMD Calibration for a Video-based Augmented Reality Conferencing System; Proc. IWAR \'99, pp. 85-94 1999.*

Japanese Office Action issued on Oct. 6, 2015 in counterpart Japanese Application No. 2012-009590. (7 pages with English translation).

* cited by examiner

Fig 2
210
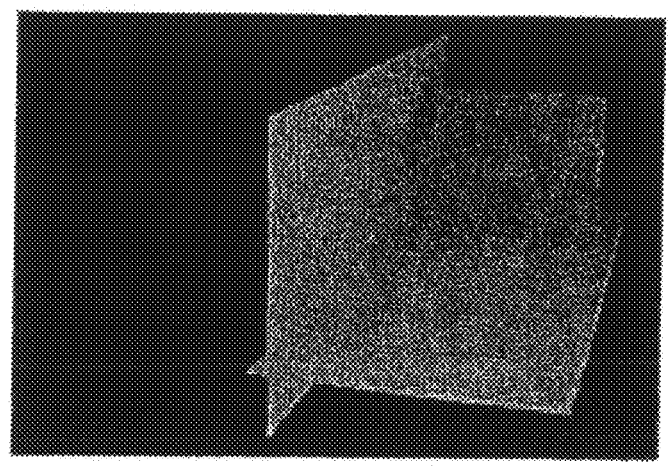
220
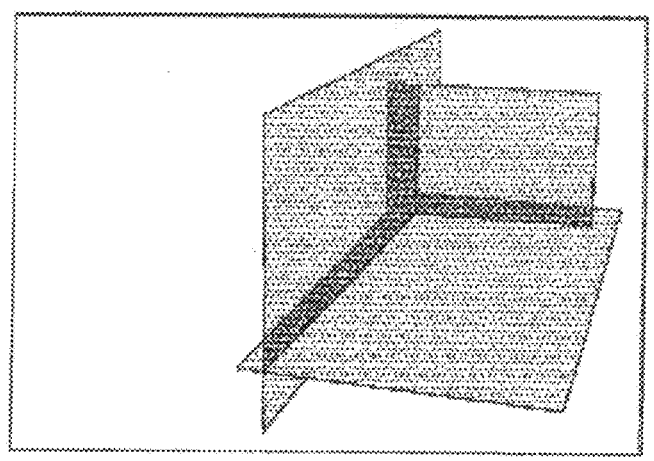

APPARATUS AND METHOD FOR ESTIMATING CAMERA MOTION USING DEPTH INFORMATION, AND AUGMENTED REALITY SYSTEM

CROSS-REFERENCE TO RELATED APPLICATIONS

This application claims the priority benefit of U.S. Provisional Patent Application No. 61/434,597, filed on Jan. 20, 2011 in the USPTO and Korean Patent Application No. 10-2011-0015099, filed on Feb. 21, 2011 and Korean Patent Application No. 10-2011-0032162, filed on Apr. 7, 2011, in the Korean Intellectual Property Office, the disclosures of which are incorporated herein by reference.

BACKGROUND

1. Field

One or more embodiments relate to technology for estimating a camera motion in real time.

2. Description of the Related Art

Augmented reality corresponds to technology that may overlappingly exhibit a virtual object in a real world. In general, the real world may use an image captured with a video camera and the like. To overlappingly express a virtual object in a video image without psycho-visual difference, the virtual object may be matched, that is, registered at the same viewpoint as the video image. Every time the video camera moves, a direction and a position of the virtual object may need to be updated. For the above operation, the direction and the position of the video camera may need to be known in real time.

A conventional method of estimating a camera motion, for example, a direction and a position of a camera may generally target an image (hereinafter, a color image) output from a camera sensor configured to sense a strength signal with respect to the wavelength of light. To estimate a camera motion for each frame, a scheme of extracting, from a color image, a set of feature components, for example, a set of points and a set of lines, and comparing and calculating within-color image position information of feature components in an adjacent frame may be employed. In this instance, since a point or a line distinguishingly different from a neighboring pixel value is extracted to extract a feature component, a color value or an intensity value of each pixel may be used.

According to conventional technologies, it may be presumed that the same point in a three-dimensional (3D) space has the same color value or a similar color value for each frame. Accordingly, when an illumination environment significantly varies, a feature component extracted from a previous frame may not be extracted from a current frame. Since a characteristic of a descriptor describing the feature component varies, two feature components may not accurately match. Specifically, it may be highly probable that the estimation of a camera motion may fail. In addition, when a number of feature pixels distinguishable from neighboring pixels is small due to, for example, iteration of similar pattern texture, an area including the same color, and the like, it may be difficult to estimate a camera motion.

SUMMARY

According to an aspect of one or more embodiments, there is provided an apparatus for estimating a camera motion, the apparatus including: an intersection point extractor to extract an intersection point from plane information of a depth image; a feature point detector to calculate a feature point associated with each of planes included in the plane information, using the extracted intersection point; and a motion extractor to extract a motion of a depth camera providing the depth image, using the calculated feature point.

The camera motion estimation apparatus may further include a plane extractor to extract plane information from the depth image.

The plane extractor may define a plane set as the plane information by applying, to a cubic equation, a point sample that is acquired from the depth camera.

The intersection point extractor may generate a subset including three elements among elements included in a plane set extracted as the plane information, and may extract vectors expressing three plane equations within the subset, and extract the intersection point using the extracted vectors.

The camera motion estimation apparatus may further include a intersection line extractor to extract an intersection line between two planes included in the plane information.

The feature point detector may calculate the feature point associated with each of planes spaced apart by a predetermined interval along the extracted intersection line based on the intersection point.

The feature point detector may calculate a plurality of feature points by adjusting the predetermined interval.

The motion extractor may calculate rotation information or translation information between a first depth camera and a second depth camera using a first feature point extracted from the first depth camera and a second feature point extracted from the second depth camera.

According to another aspect of one or more embodiments, there is provided an apparatus for estimating a camera motion, the apparatus including: a feature point detector to calculate a first feature point included in first plane information that is extracted from a first frame of a first depth camera, and a second feature point included in second plane information that is extracted from a second frame of a second depth camera; and a motion extractor to extract a motion between the first depth camera and the second depth camera using the first feature point and the second feature point.

The intersection line extractor may extract an edge by applying a differential operator to the depth image. The motion extractor may extract the motion of the depth camera providing the depth image, using the extracted edge.

According to still another aspect of one or more embodiments, there is provided a method of estimating a camera motion, the method including: extracting an intersection point from plane information of a depth image that is acquired from a depth camera; calculating a feature point associated with each of planes included in the plane information, using the extracted intersection point; and extracting a motion of the depth camera providing the depth image, using the calculated feature point.

According to yet another aspect of one or more embodiments, there is provided an augmented reality system, including: a depth camera to generate a depth image; a camera motion estimation apparatus to estimate a motion of the depth camera using the depth image; a pose update unit to update a camera pose with the estimated motion; a virtual camera pose update unit to update a virtual camera pose using the updated camera pose; a color image capturing unit to capture a color image from a color camera having the same viewpoint as the depth camera; a matching device to match the updated virtual camera pose with a virtual object by referring to a virtual object database; and a real image/virtual object matching unit to match the captured color image and the matched virtual object.

According to a further another aspect of one or more embodiments, there is provided an augmented reality system, including: a depth camera to generate a depth image; a camera motion estimation apparatus to estimate a motion of the depth camera using the depth image; a pose update unit to update a camera pose with the estimated motion; a color image capturing unit to capture a color image from a color camera having a viewpoint different from the depth camera; a camera calibrator to calibrate different viewpoints of the depth image and the color image so that the depth image and the color image have the same viewpoint; a virtual camera pose update unit to update a virtual camera pose using the updated camera pose and the calibrated viewpoint; a matching device to match the updated virtual camera pose with a virtual object by referring to a virtual object database; and a real image/virtual object matching unit to match the color image with the calibrated viewpoint and the matched virtual object.

According to still another aspect of one or more embodiments, there is provided an apparatus for estimating a camera motion, the apparatus including: an edge extractor to extract an edge by applying a differential operator to a depth image; and a motion extractor to extract a motion of a depth image providing the depth image, using the extracted edge.

According to one or more embodiments, even though an illumination environment dynamically varies or regardless of a texture state within a space, it is possible to estimate a camera motion.

According to one or more embodiments, by extracting, from a depth camera, plane information generally present in a real space and by calculating a feature point with respect to each plane based on the extracted plane information, it is possible to use the calculated feature point for estimating a camera motion.

According to one or more embodiments, a camera motion estimation apparatus may be applicable to fields of tracking a position and a direction of a camera, for example, augmented reality, a mixed reality, a robot cleaner, automated robot travel, automated vehicle travel, a smart phone, a tablet personal computer (PC) application, and the like.

According to one or more embodiments, a camera motion estimation apparatus may employ a depth image generated with a depth camera to overcome constraints of motion estimation technology based on a color camera and thus, may operate even in a case where it is impossible to estimate a camera motion using a color image based on a brightness value.

According to one or more embodiments, when plane information is absent within a space of a depth image, it is possible to extract an edge having a rotation invariant edge by applying a differential operator to the depth image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 2 illustrates a depth image and a color image in an environment including three planes according to embodiments;

DETAILED DESCRIPTION

Figure 1:
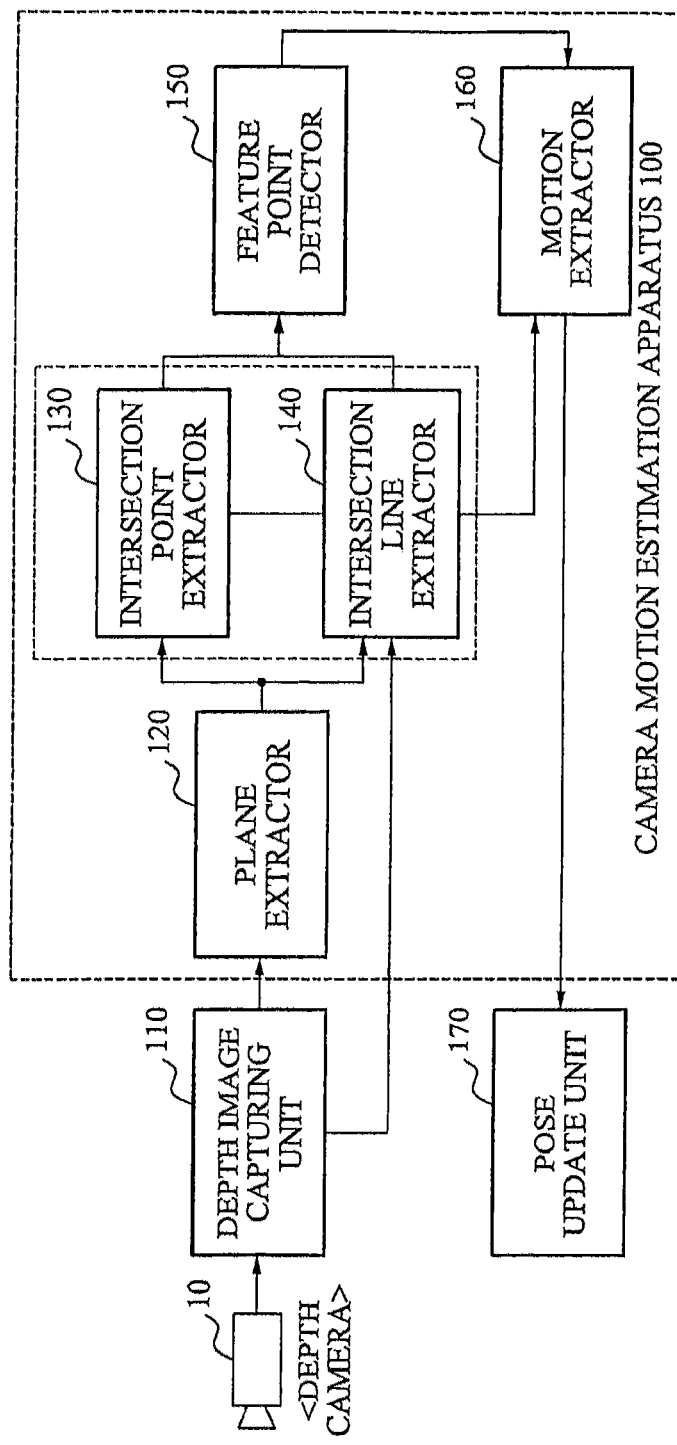
FIG. 1 illustrates a configuration of a camera motion estimation apparatus according to embodiments.

Reference will now be made in detail to embodiments, examples of which are illustrated in the accompanying drawings, wherein like reference numerals refer to the like elements throughout. Embodiments are described below to explain the present disclosure by referring to the figures.

To estimate a camera motion, a feature component within an image may be extracted and be used to calculate a position and a direction of a camera through matching between feature components in each frame. However, when the feature component is not normally extractable from the image due to, for example, a lack of texture, an iterative texture pattern, a dark illumination, a significant brightness difference, and the like, it may be difficult to estimate the camera motion. Accordingly, an augmented reality system corresponding to one embodiment of camera motion estimation may not overlappingly express a virtual object in an actual video. To successfully extract the camera motion, texture information within a space may need to be artificially deployed.

To solve the above constraint, a depth image may be used. For example, in a color image, a pixel value with respect to the same position varies according to a change in an illumination environment. However, in the depth image, even though the illumination environment varies, the same position may have the same pixel value. Accordingly, a camera motion estimation apparatus according to embodiments may estimate a camera motion using a depth image.

FIG. 1 illustrates a configuration of a camera motion estimation apparatus 100 according to embodiments.

Referring to FIG. 1, the camera motion estimation apparatus 100 may include a depth image capturing unit 110, a plane extractor 120, an intersection point extractor 130, an intersection line extractor 140, a feature point detector 150, a motion extractor 160, and a pose update unit 170.

A depth camera 10 may generate a three-dimensional (3D) depth image using a time-of-flight (TOF) scheme. The depth camera 10 may be used to capture a 3D image.

The depth image capturing unit 110 may capture a depth image generated from the depth camera 10.

FIG. 2 illustrates a depth image 210 and a color image 220 in an environment including three planes according to embodiments.

Referring to FIG. 2, each of the depth image 210 and the color image 220 may include three planes. In general, compared to the color image 220, the depth image 210 may be relatively less affected by a change in an illumination environment and a texture state within a space. The color image 220 may be relatively significantly affected by the change in the illumination environment and the texture state and thus, may not be readily used to estimate a camera motion. In particular, even though a small number of feature pixels is distinguishable from neighboring pixels due to, for example, iteration of a similar texture pattern, an area including the same color, and the like, the color image 220 may not be readily used to estimate the camera motion.

Accordingly, the camera motion estimation apparatus 100 may estimate the camera motion using the depth image 210.

Even though each of the depth image 210 and the color image 220 includes three planes as an example in FIG. 2, it does not mean that only three planes are present in a space. Since minimum three planes are used to calculate an intersection point, three planes are used for easiness of description. For example, even though each the depth image 210 and the color image 220 includes three or more planes, the camera motion estimation apparatus 100 may estimate the camera motion using the depth image 210.

The plane extractor 120 may extract plane information from the depth image 210. The plane extractor 120 may extract information associated with all the planes within a space using a point sample acquired from the depth camera 10. For example, the plane extractor 120 may extract plane information using a random sample consensus (RANSAC) algorithm. However, it is not limited thereto. The plane extractor 120 may define a plane set as the plane information by applying the point sample to a cubic equation according to Equation 1.

$$S^j = \{\Pi_i^j | \Pi_i^j : a_i x + b_i y + c_i z + d_i = 0, 1 \le i \le n\} \quad \text{[Equation 1]}$$

In Equation 1, $S^j$ denotes a plane set including, as elements, all the planes extracted from a $j^{th}$ frame, j denotes a frame number, i denotes a plane index extracted from the $j^{th}$ frame, and n denotes a total number of planes.

The intersection point extractor 130 may extract an intersection point from the plane information. For example, when the intersection line extractor 140 extracts an intersection line between two planes among a plurality of planes included in the plane information, the intersection point extractor 130 may calculate an intersection point based on intersection between extracted intersection lines. Here, the intersection lines may be used to calculate a subsequent intersection point that is additionally calculated, instead of calculating an initial intersection point. The intersection point extractor 130 may directly calculate the intersection point according to a plane equation using Equation 4.

For example, the intersection point extractor 130 may calculate an intersection point in a 3D space using three planes included in the plane information. In general, minimum three planes may be used to calculate the intersection point of planes. The intersection point extractor 130 may generate combinations of all the subsets $S_t^j$, each including three elements among elements of a plane set $S^j$, as expressed by Equation 2.

$$S_t^j = \{\Pi_{a,b,c}^j | \Pi_{a,b,c}^j \in S^j, \{a, b, c\} \subset \{1 \ldots n\}\} \quad \text{[Equation 2]}$$

In Equation 2, $S_t^j$ denotes a subset of $S^j$ and may include three planes. j denotes the frame number, each of a, b, and c denotes a plane index belonging to $S_t^j$, that is, an index of a plane belonging to Sj, and n denotes a total number of planes that is the same as n described in $S^j$ of Equation 1. Depending on embodiments, the intersection point extractor 130 may set a number of subsets according to Equation 3.

$$1 \le t \le \frac{n(n-1)(n-2)}{3!} \quad \text{[Equation 3]}$$

In Equation 3, t denotes a number of subsets and n denotes the total number of planes.

The intersection point extractor 130 may extract vectors expressing three plane equations within a subset. For example, vectors expressing three plane equations with the subset $S_t^j$ may correspond to $(a_1, b_1, c_1, d_1)$, $(a_2, b_2, c_2, d_2)$, and $(a_3, b_3, c_3, d_3)$, respectively.

The intersection point extractor 130 may extract the intersection point using the extracted vectors. For example, the intersection point extractor 130 may calculate coordinates $P_{t,0}^j = (x_{t,0}^j, y_{t,0}^j, z_{t,0}^j)$ in the 3D space of the intersection point of three planes included in the subset $S_t^j$ extracted from the $j^{th}$ frame, according to Equation 4. Here, j denotes the frame number and t denotes a total number of frames.

$$x_{t,0}^j = -\frac{\begin{bmatrix} d_1 & b_1 & c_1 \\ d_2 & b_2 & c_2 \\ d_3 & b_3 & c_3 \end{bmatrix}}{DET}, \quad y_{t,0}^j = -\frac{\begin{bmatrix} a_1 & b_1 & c_1 \\ a_2 & b_2 & c_2 \\ a_3 & b_3 & c_3 \end{bmatrix}}{DET},$$

$$z_{t,0}^j = -\frac{\begin{bmatrix} a_1 & b_1 & d_1 \\ a_2 & b_2 & d_2 \\ a_3 & b_3 & d_3 \end{bmatrix}}{DET}, \quad \text{[Equation 4]}$$

In Equation 4, $x_{t,0}^j$, $y_{t,0}^j$, $z_{t,0}^j$ may correspond to coordinates of three planes, respectively. In this example, $$DET = \begin{bmatrix} a_1 & b_1 & c_1 \\ a_2 & b_2 & c_2 \\ a_3 & b_3 & c_3 \end{bmatrix}.$$

When 'DET=0', it may correspond to a case where at least two planes among three planes are in parallel with each other and thus, an intersection point is absent. Accordingly, the intersection point extractor 130 may exclude the above case from calculation.

The feature point detector 150 may calculate a feature point associated with each of planes included in the plane information, using the extracted intersection point.

Figure 3:
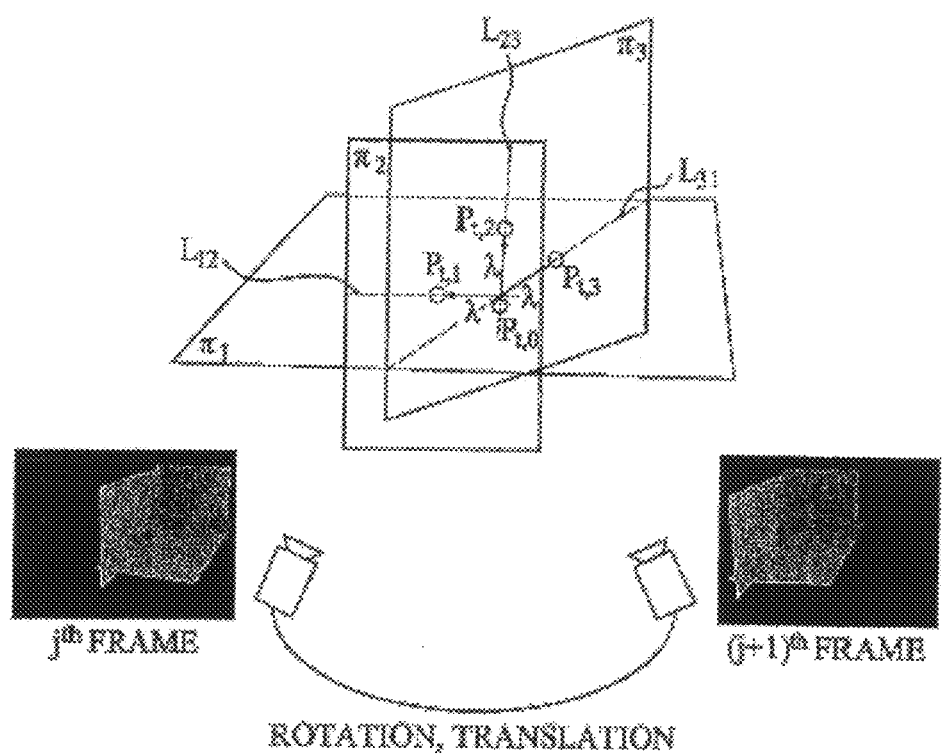
FIG. 3 illustrates an example of estimating a camera motion using a depth image according to embodiments.

FIG. 3 illustrates an example of estimating a camera motion using a depth image according to embodiments.

The intersection line extractor 140 may extract an intersection line between two planes included in plane information. For example, referring to FIG. 3, when the plane information includes planes π1, π2, and π3, the intersection line extractor 140 may extract an intersection line L12 between the planes $\pi1$ and $\pi2$, may extract an intersection line L31 between the planes $\pi1$ and $\pi3$, and may extract an intersection line L23 between the planes $\pi2$ and $\pi3$.

The feature point detector 150 may calculate a feature point associated with each plane spaced apart by a predetermined interval along the intersection line based on the intersection point. As shown in FIG. 3, the intersection lines L12, L31, and L23 may be present between respective two planes. The feature point detector 150 may calculate an additional feature point, for example, $P_{t,1}{}^j$, $P_{t,2}{}^j$, $P_{t,3}{}^j$ that is spaced apart by a predetermined interval '$\lambda$' along each intersection line, as expressed by Equation 5.

$$P_{t,1}{}^j = P_{t,0}{}^j + \lambda L_{12}{}^j$$

$$P_{t,2}{}^j = P_{t,0}{}^j + \lambda L_{23}{}^j$$

$$P_{t,3}{}^j = P_{t,0}{}^j + \lambda L_{31}{}^j \quad \text{[Equation 5]}$$

In Equation 5, $P_{t,1}{}^j$ denotes a feature point with respect to the plane $\pi_1$, $P_{t,2}{}^j$ denotes a feature point with respect to the plane $\pi_2$, and $P_{t,3}{}^j$ denotes a feature point with respect to the plane $\pi_3$.

Figure 4:
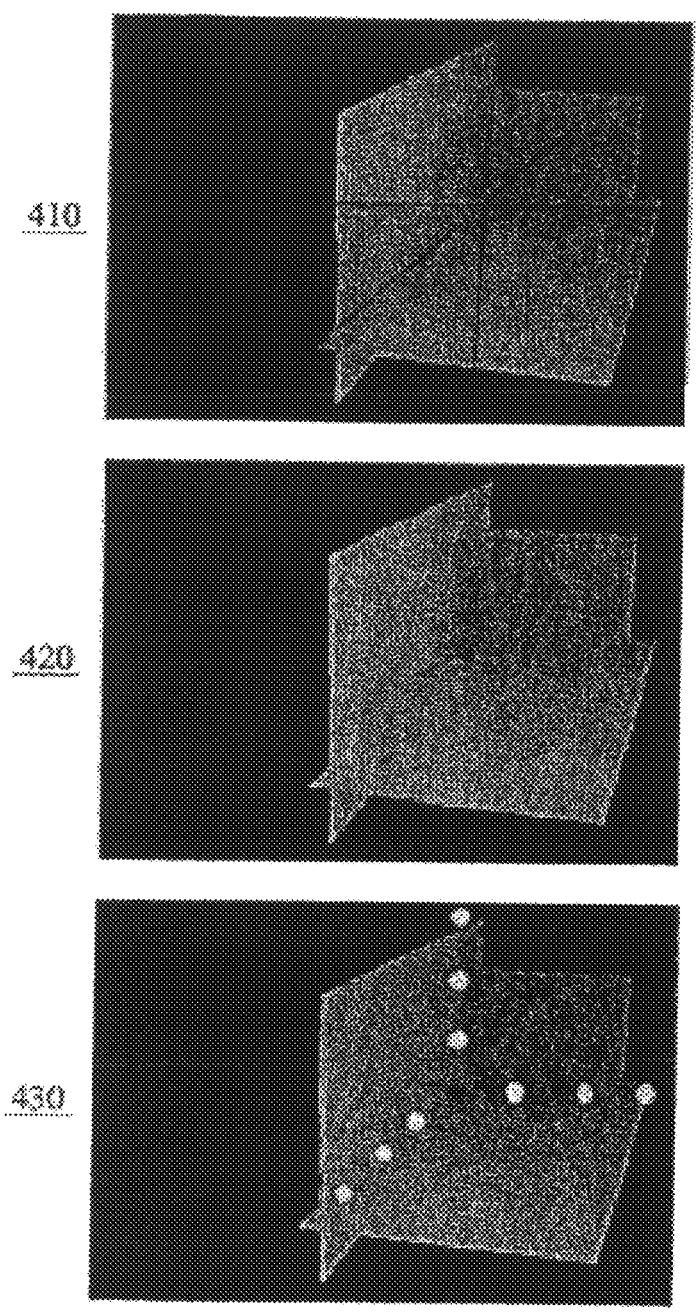
FIG. 4 illustrates an example of extracting an intersection point and an intersection line from plane information extracted from a depth image according to embodiments.

FIG. 4 illustrates an example of extracting an intersection point and an intersection line from plane information extracted from a depth image according to embodiments.

Referring to an image 410 of FIG. 4, the intersection line extractor 140 may extract an intersection line between two neighboring planes to calculate an intersection point of three planes included in plane information. Since three planes are present in the image 410, the intersection line extractor 140 may extract three intersection lines. Referring to an image 420, the intersection point extractor 130 may extract, as an intersection point, central coordinates at which the extracted three intersection lines meet. Referring to an image 430, the feature point detector 150 may calculate a feature point associated with each of planes that are spaced apart by a predetermined interval along the extracted intersection lines based on the intersection point.

The feature point detector 150 may calculate a plurality of feature points by adjusting the predetermined interval. For example, a number of additional feature points may increase by three folds of 'm' that is a number of $\lambda_m$ and a total number of extracted feature points $n_{features} = 1 + 3m$. The image 430 shows feature points that are additionally extracted using intersection lines and the intersection point of three planes, and corresponds to a case where 'm=3'. As described above, the feature point detector 150 may calculate a feature point in a $j^{th}$ frame and may calculate a feature point in a $(j+1)^{th}$ frame.

The motion extractor 160 may extract a motion of the depth camera using the calculated feature points. For example, the motion extractor 160 may calculate rotation information or translation information between a first depth camera (not shown) and a second depth camera (not shown) using a first feature point extracted from the first depth camera and a second feature point extracted from the second depth camera according to another aspect of the embodiment.

For example, the first feature point may correspond to the feature point extracted from the $j^{th}$ frame, and the second feature point may correspond to the feature point extracted from the $(j+1)^{th}$ frame. The motion extractor 160 may calculate relative rotation information or translation information between the first depth camera and the second depth camera using feature point sets $P_{k=1\ldots n}{}^j$ and $P_{k=1\ldots n}{}^{j+1}$ in two frames, for example, the $j^{th}$ frame and the $(j+1)^{th}$ frame according to Equation 6.

$$[R_{3\times3}, T_{3\times1}] = F(P_{k=1\ldots n}{}^j, P_{k=1\ldots n}{}^{j+1}) \quad \text{[Equation 6]}$$

In Equation 6, $R_{3\times3}$ denotes rotation information, $T_{3\times1}$ denotes translation information, and F denotes a function for matching two feature points. The function F for matching two feature points may use an algorithm such as iterative closest points (ICP).

The motion extractor 160 may calculate a transformation matrix 'RT' between the first depth camera and the second depth camera according to Equation 7.

$$RT = \begin{bmatrix} R_{3\times3} & T_{3\times1} \\ 0_{1\times3} & 1 \end{bmatrix} \quad \text{[Equation 7]}$$

The pose update unit 170 may calculate a pose of each of the first depth camera and the second depth camera using the transformation matrix according to Equation 8. An initial camera pose $Proj_0$ may be defined as a depth camera coordinate system of a first frame and may be expressed as an identity matrix when the initial camera pose $Proj_0$ is assumed to be matched with a world coordinate system.

$$Proj_{j+1} = RT^{-1} \cdot Proj_j, Proj_0 = \begin{bmatrix} I_{3\times3} & 0_{3\times1} \\ 0_{1\times3} & 1 \end{bmatrix} \quad \text{[Equation 8]}$$

In Equation 8, $Proj_{j+1}$ denotes the depth camera coordinate system of the $(j+1)^{th}$ frame, $RT^{-1}$ denotes an inverse matrix of the transformation matrix RT, and $Proj_0$ denotes the depth camera coordinate system of the $j^{th}$ frame.

The camera motion estimation apparatus 100 may be applied to an augmented reality system and thereby be executed. The augmented reality system may overlappingly exhibit a virtual object in the real world.

For example, the intersection line extractor 140 may directly extract an edge by applying a differential operator to the depth image. The differential operator may correspond to a first differential operator, for example, a gradient operator, or a second differential operator, for example, a Laplacian operator. The first differential operator may be classified as an x-directional differentiation fx and a y-directional differentiation fy as expressed by Equation 9.

$$fx = f(x+1, y) - f(x, y)$$

$$fy = f(x, y+1) - f(x, y) \quad \text{[Equation 9]}$$

In Equation 9, x may correspond to a pixel value of an x-directional depth image and y may correspond to a pixel value of a y-directional depth image.

TABLE 1

| Operator name | fx | | | fy | | |
|---|---|---|---|---|---|---|
| Roberts | 0 | 0 | 0 | 0 | 0 | 0 |
|  | 0 | 1 | 0 | 0 | 0 | 1 |
|  | 0 | 0 | −1 | 0 | −1 | 0 |
| Prewitt | −1 | 0 | 1 | 1 | 1 | 1 |
|  | −1 | 0 | 1 | 0 | 0 | 0 |
|  | −1 | 0 | 1 | −1 | −1 | −1 |
| Sobel | −1 | 0 | 1 | 1 | 2 | 1 |
|  | −2 | 0 | 2 | 0 | 0 | 0 |
|  | −1 | 0 | 1 | −1 | −2 | −1 |
| Frei-chen | −1 | 0 | 1 | 1 | $\sqrt{2}$ | 1 |
|  | $-\sqrt{2}$ | 0 | $\sqrt{2}$ | 0 | 0 | 0 |
|  | −1 | 0 | 1 | −1 | $-\sqrt{2}$ | −1 |

The intersection line extractor 140 may extract the edge by applying various types of first differential operators to the depth image.

A second differentiation method may correspond to a method of differentiating a first differentiation again. For example, the intersection line extractor 140 may extract the edge by applying, to the depth image, the Laplacian operator of applying Laplacian mask as the second differential operator. The Laplacian operator may correspond to a scheme of measuring a brightness change amount in the depth image and extracting, as the edge, a portion with a relatively great change. Compared to a first differentiation scheme, the Laplacian operator may be robust against noise.

For example, when plane information is absent within a space of the depth image, the intersection line extractor 140 may extract the edge having a rotation invariant feature by applying the second differential operator to the depth image.

$$\begin{bmatrix} 0 & -1 & 0 \\ -1 & 4 & -1 \\ 0 & -1 & 0 \end{bmatrix} \text{ or } \begin{bmatrix} -1 & -1 & -1 \\ -1 & 8 & -1 \\ -1 & -1 & -1 \end{bmatrix}$$

$$\begin{bmatrix} 0 & 1 & 0 \\ 1 & -4 & 1 \\ 0 & 1 & 0 \end{bmatrix} \text{ or } \begin{bmatrix} 1 & 1 & 1 \\ 1 & -8 & 1 \\ 1 & 1 & 1 \end{bmatrix}$$

[Equation 10]

The intersection line extractor 140 may extract the edge by applying a matrix of Equation 10 to the depth image. Equation 10 may correspond to a mask for configuring the Laplacian operator that is one example to detect the edge. In addition, the intersection line extractor 140 may extract the edge using a variety of second differential operators, for example, a Gaussian-Laplacian operator.

The motion extractor 160 may extract a motion of the depth camera providing the depth image using the extracted edge.

Figure 5:
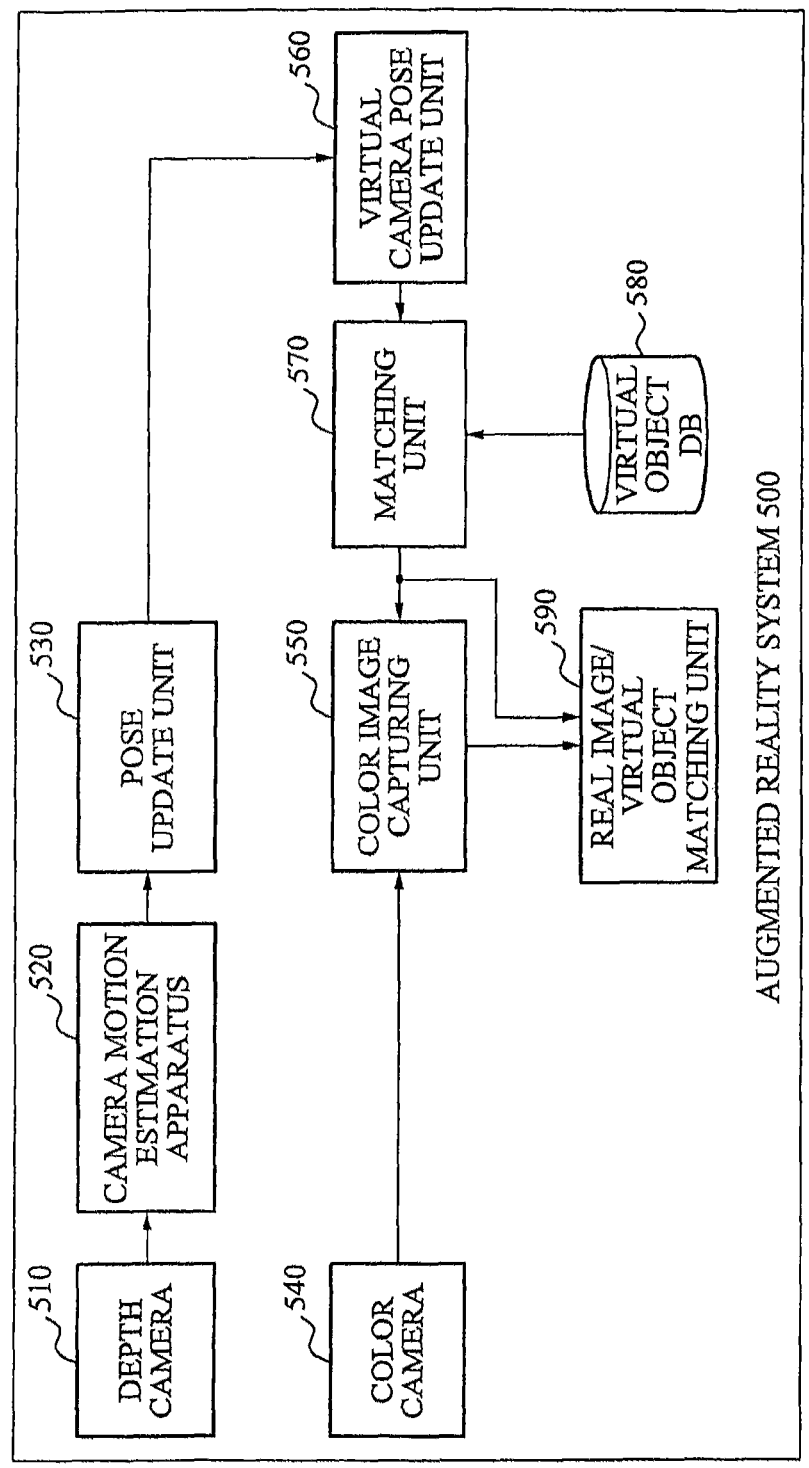
FIG. 5 illustrates an example of matching a virtual object in an augmented reality system when a color image and a depth image having the same viewpoint are provided according to embodiments.

FIG. 5 illustrates an example of matching a virtual object in an augmented reality system 500 when a color image and a depth image having the same viewpoint are provided according to embodiments.

Referring to FIG. 5, the augmented reality system 500 may estimate a camera motion by transferring a depth image captured by a depth camera 510 to a camera motion estimation apparatus 520, and may update a camera pose with the estimated camera motion using a pose update unit 530. A virtual camera pose update unit 560 may update a virtual camera pose using the camera pose updated by the pose update unit 530.

A virtual object database 580 may store a virtual object to be matched. As the virtual camera pose is updated by the virtual camera pose update unit 560, a matching unit 570 may extract the virtual object from the virtual object database 580 and may match the extracted virtual object and the updated virtual camera pose.

A color image capturing unit 550 may capture a color image from a color camera 540 having the same viewpoint as the depth camera 510.

A real image/virtual object matching unit 590 may match again the color image and the matched virtual object and thereby apply the captured color image to the matched virtual object.

Figure 6:
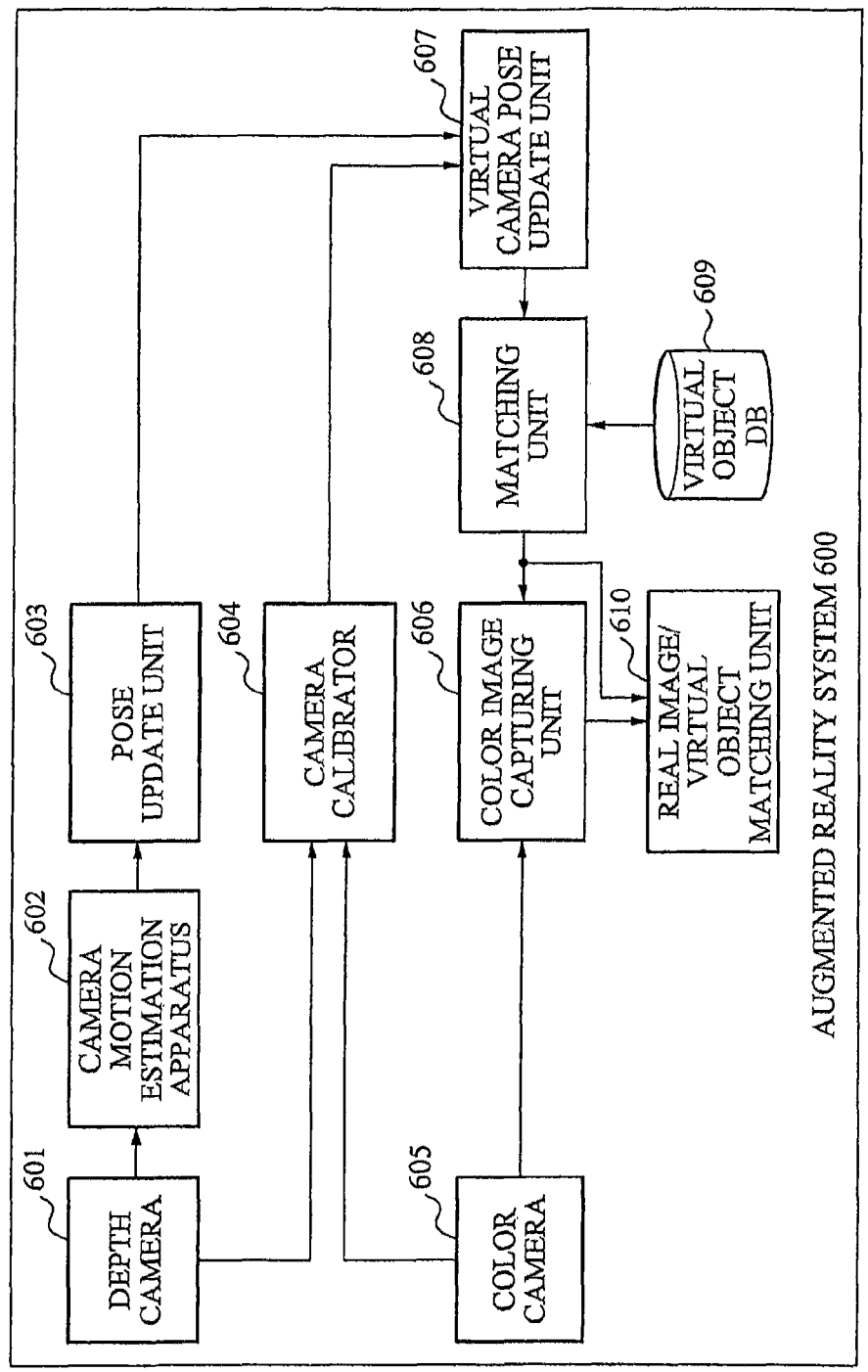
FIG. 6 illustrates an example of matching a virtual object in an augmented reality system when a color image and a depth image having different viewpoints are provided according to embodiments.

FIG. 6 illustrates an example of matching a virtual object in an augmented reality system 600 when a color image and a depth image having different viewpoints are provided according to embodiments.

Referring to FIG. 6, the augmented reality system 600 may transfer a depth image captured by a depth camera 601 to a camera motion estimation apparatus 602, and may estimate a motion of the depth camera 601.

A color image acquiring unit 606 may acquire a color image from a color camera 605 having a viewpoint different from a view point of the depth camera 601.

The augmented reality system 600 may further include a camera calibrator 604 to calibrate different viewpoints between the depth image and the color image. The camera calibrator 604 may calibrate the different viewpoints so that the depth image and the color image having the different viewpoints may have the same viewpoint.

A virtual camera pose update unit 607 may update a virtual camera pose using a camera pose updated by a pose update unit 603 and the viewpoint calibrated by the camera calibrator 604.

A matching unit 608 may match the updated virtual camera pose and a virtual object by referring to a virtual object database 609.

A real image/virtual object matching unit 610 may match the color image with the calibrated viewpoint and the matched virtual object.

Figure 7:
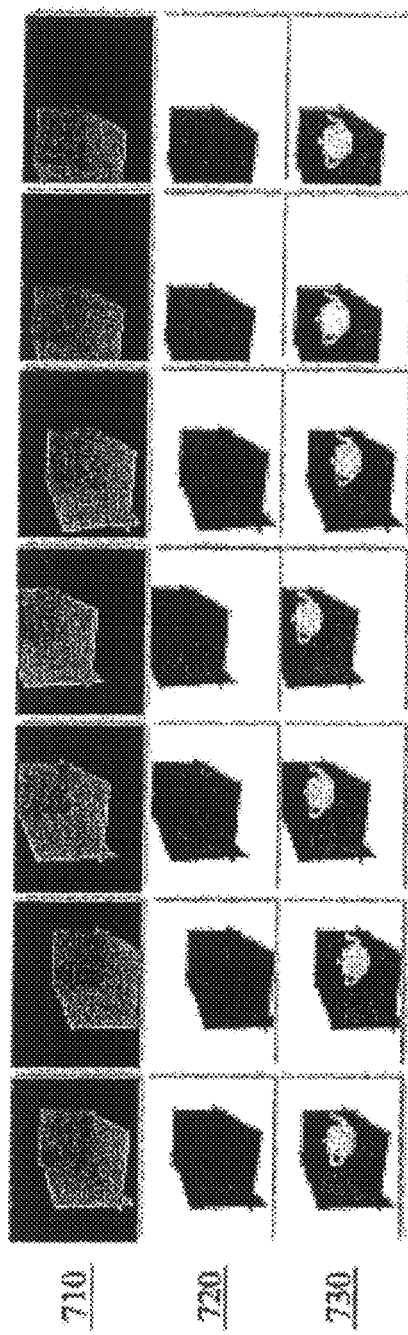
FIG. 7 illustrates an example of matching a virtual image and a color image using a camera motion extracted from a depth image according to embodiments.

FIG. 7 illustrates an example of matching a virtual image and a color image using a camera motion extracted from a depth image according to embodiments.

Referring to FIG. 7, an augmented reality system may generate a matched image 730 by matching a depth image 710 and a color image 720 having the same viewpoint as the depth image 710. For example, in the matched image 730, a kettle corresponding to a virtual object is overlapped with the color image 720 using camera motion information, for example, rotation information and translation information extracted from the depth image 710. A motion of a camera may be reflected in a pose of the virtual object.

Figure 8:
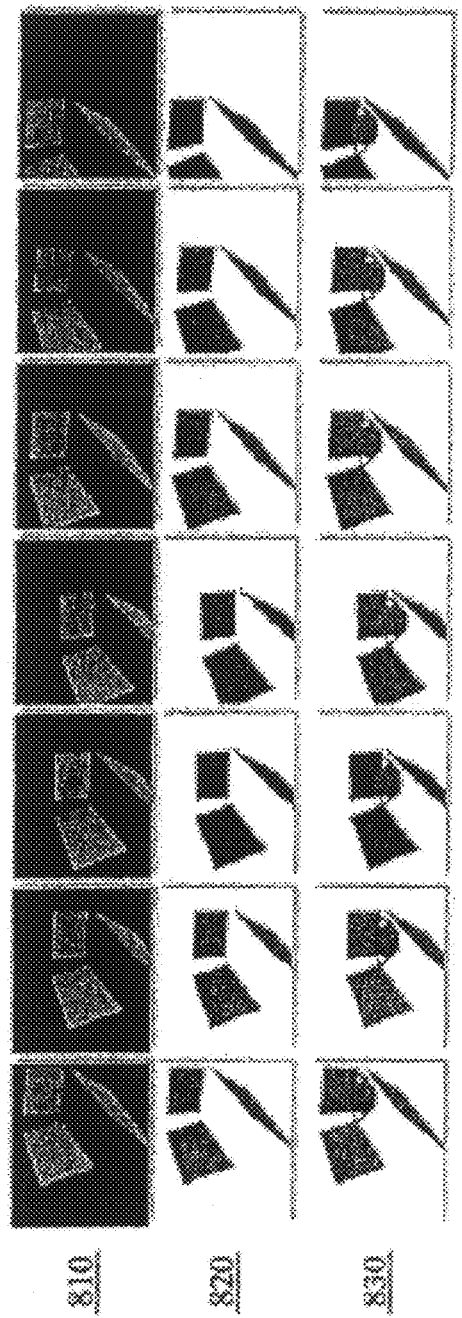
FIG. 8 illustrates an example of matching a virtual object and a color image in which three planes do not physically intersect with each other according to embodiments.

FIG. 8 illustrates an example of matching a virtual object and a color image in which three planes do not physically intersect with each other according to embodiments.

Referring to FIG. 8, when three planes do not physically intersect with each other in a space, an augmented reality system may generate a matched image 830 by matching a depth image 810 and a color image 820 having the same viewpoint as the depth image 810. As shown in the color image 820, even though illumination environments vary, the camera motion estimation apparatus 100 may estimate a camera motion using the depth image 810. Since the illumination change of the color image 820 does not affect the depth image 810, the camera motion estimation apparatus 100 may accurately estimate the camera motion.

Figure 9:
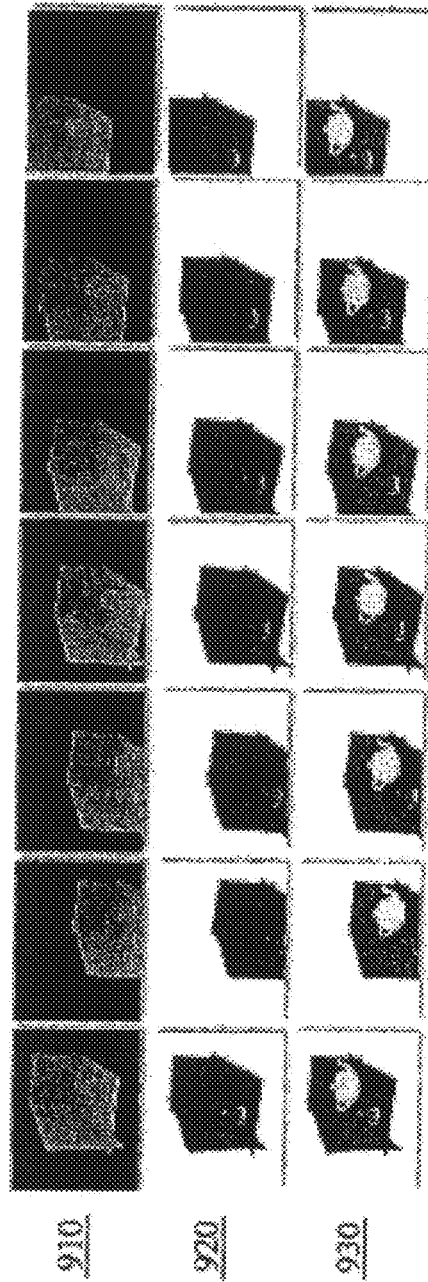
FIG. 9 illustrates an example of matching a virtual object and a color image in which an actual object is present according to embodiments.

FIG. 9 illustrates an example of matching a virtual object and a color image in which an actual object is present according to embodiments.

Referring to FIG. 9, even though the actual object is present in a color image 920, an augmented reality system may generate a matched image 930 by matching a depth image 910 and the color image 920. Even though actual objects, for example, a telephone and a decoration are present in the color image 920, the camera motion estimation apparatus 100 may estimate a camera motion using the depth image 910. Since the actual objects included in the color image 920 do not affect the depth image 910, the camera motion estimation apparatus 100 may accurately estimate the camera motion.

Figure 10:
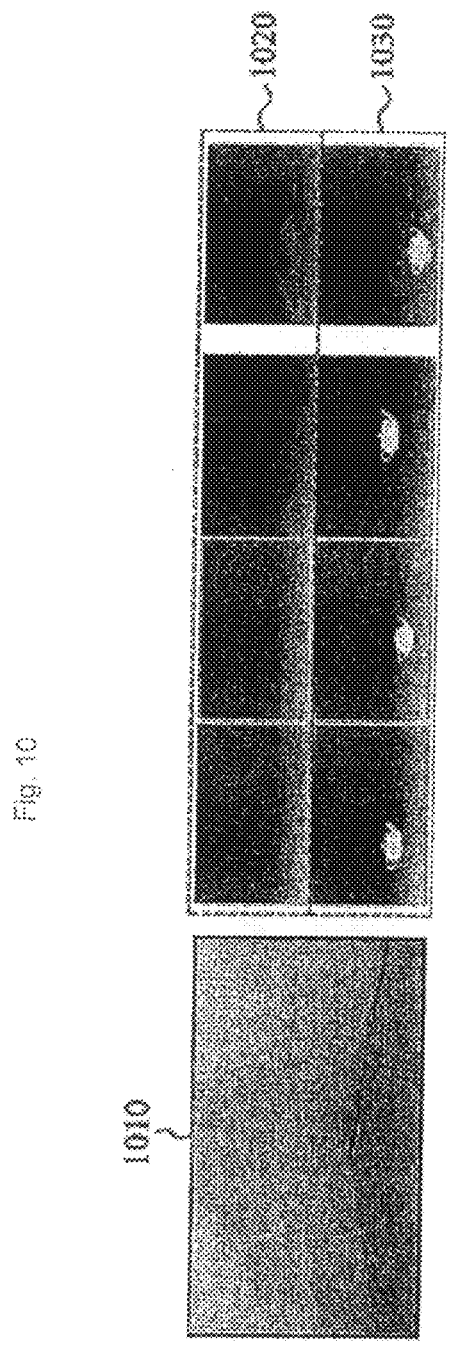
FIG. 10 illustrates an example of matching a virtual object using a depth image photographed with a depth camera according to embodiments.

FIG. 10 illustrates an example of matching a virtual object using a depth image photographed with a depth camera according to embodiments.

Referring to FIG. 10, an image 1010 shows an actual space and an image 1020 corresponds to a depth image photographed from a depth camera. The image 1020 may include an actual object, for example, a telephone in addition to planes within the actual space of the image 1010. An image 1030 corresponds to an image acquired by estimating, by the augmented reality system using the camera motion estimation apparatus 100, a camera motion, and by matching the actual object, for example, the telephone and a virtual object, for example, a kettle.

Figure 11:
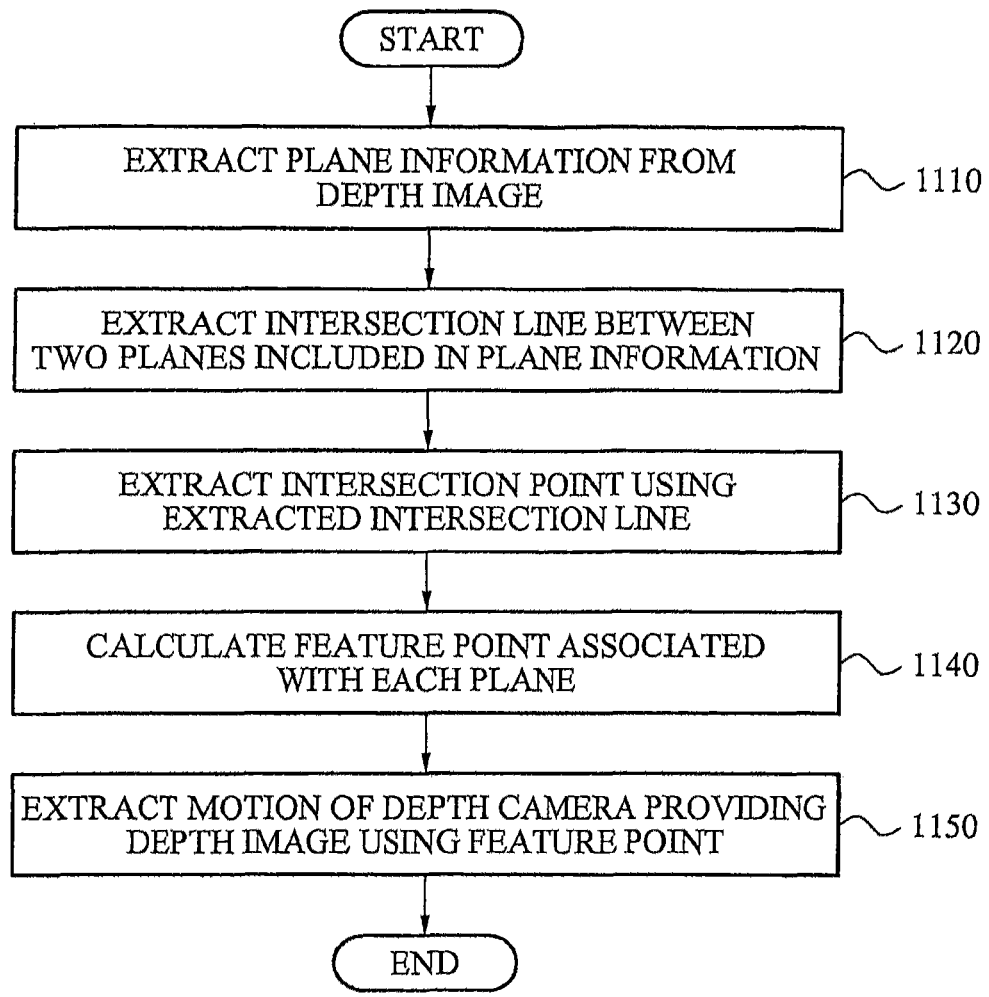
FIG. 11 illustrates a method of estimating a camera motion according to embodiments.

FIG. 11 illustrates a method of estimating a camera motion according to embodiments.

The camera motion estimation method may be performed by the camera motion estimation apparatus 100 of FIG. 1.

In operation 1110, the camera motion estimation apparatus 100 may extract plane information from a depth image captured from a depth camera 10. For example, since the depth image corresponds to a 3D image, three planes may be extracted from the depth image. The camera motion estimation apparatus 100 may define a plane set as the plane information by applying, to a cubic equation, a point sample acquired from the depth camera 10.

In operation 1120, the camera motion estimation apparatus 100 may extract an intersection line between two planes included in the extracted plane information. For example, when three planes $\pi_1$, $\pi_2$, and $\pi_3$ are included in the plane information, the camera motion estimation apparatus 100 may extract an intersection line $L_{12}$ between the planes $\pi_1$ and $\pi_2$, may extract an intersection line $L_{31}$ between the planes $\pi_1$ and $\pi_3$, and may extract an intersection line $L_{23}$ between the planes $\pi_2$ and $\pi_3$.

In operation 1130, the camera motion estimation apparatus 100 may extract an intersection point using the extracted intersection lines. For example, the camera motion estimation apparatus 100 may generate a subset including three elements among elements of the plane set extracted as the plane information, and may extract three vectors expressing three plane equations within the subset and extract the intersection point using the three vectors.

In operation 1140, the camera motion estimation apparatus 100 may calculate a feature point associated with each plane spaced apart along the intersection line based on the intersection point. The camera motion estimation apparatus 100 may calculate the feature point associated with each plane that is spaced apart from the intersection point by a predetermined interval along the intersection line. For example, the camera motion estimation apparatus 100 may calculate feature points $P_{t,1}{}^j$, $P_{t,2}{}^j$, and $P_{t,3}{}^j$ associated with planes $\pi_1$, $\pi_2$, and $\pi_3$ that are spaced apart from the intersection point by the predetermined interval '$\lambda$' along corresponding intersection lines.

In operation 1150, the camera motion estimation apparatus 100 may estimate a motion of the depth camera using the calculated feature point. The camera motion estimation apparatus 100 may calculate rotation information and translation information between a first depth camera (not shown) and a second depth camera (not shown) using a first feature point that is extracted from the first depth camera and a second feature point that is extracted from the second depth camera.

Even though the camera motion estimation apparatus 100 may not extract the same feature point between frames due to a great change in an illumination, it is possible to expand the usage range of camera motion estimation technology. For example, when the camera motion estimation technology is applied to a case where the camera motion estimation apparatus 100 may not extract a feature point due to a significantly dark illumination, a case where the camera motion estimation apparatus 100 may not find a feature point in a space including a homogeneous texture, for example, a mono color, a case where feature points may not accurately match due to an iterative texture pattern, and the like, it is possible to expand the usage range of camera motion estimation technology by relieving environmental constraints.

In a real space, plane information such as a wall, a floor, a ceiling, a desk, and the like may be readily extracted. Accordingly, the camera motion estimation apparatus 100 may easily and readily estimate the camera motion using features of a real environment without experiencing a complex process.

When developing a robust hybrid camera motion estimation system simultaneously using a color camera and a depth camera, the camera motion estimation apparatus 100 may be employed as a motion estimation module of the depth camera.

Figure 12:
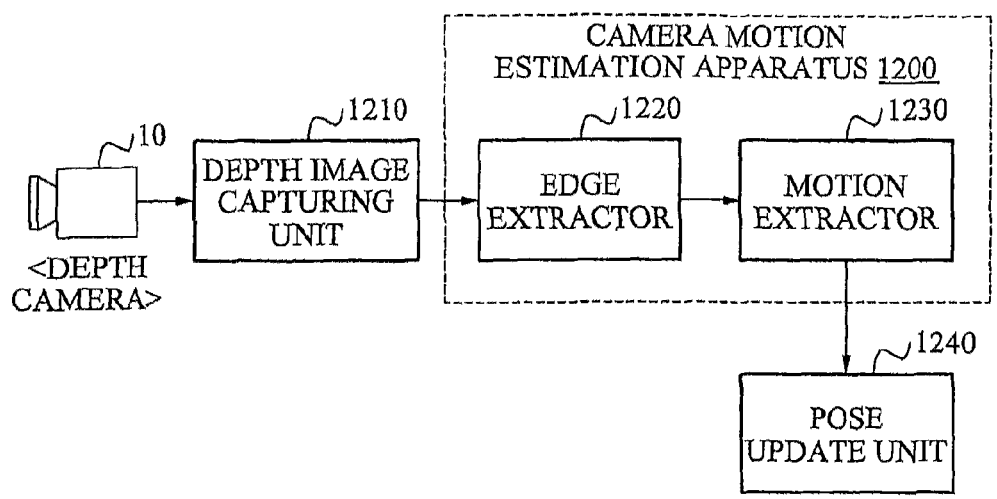
FIG. 12 illustrates a camera motion estimation apparatus according to other embodiments.

FIG. 12 illustrates a camera motion estimation apparatus 1200 according to other embodiments.

Referring to FIG. 12, the camera motion estimation apparatus 1200 may include a depth image capturing unit 1210, an edge extractor 1220, a motion extractor 1230, and a pose update unit 1240.

The depth image capturing unit 1210 may capture a depth image generated from a depth camera.

The edge extractor 1220 may extract an edge by applying a differential operator to the depth image. The edge extractor 1220 may extract the edge by applying a first differential operator to the depth image (see Equation 9 and Table 1). The edge extractor 1220 may extract the edge using various types of first differential operators, for example, Roberts, Prewitt, Sobel, and Frei-chen.

The edge extractor 1220 may also extract the edge by applying a second differential operator to the depth image (see Equation 10). A second differentiation corresponds to a method of differentiating a first differentiation again. For example, the edge extractor 1220 may extract the edge by applying, to the depth image, a Laplacian operator of applying a Laplacian mask as the second differential operator. The Laplacian operator may correspond to a scheme of measuring a brightness change amount in the depth image and extracting, as the edge, a portion with a relatively great change. Compared to a first differentiation scheme, the Laplacian operator may be robust against noise.

For example, when plane information is absent within a space of the depth image, the edge extractor 1220 may extract an edge having a rotation invariant feature by applying the second differential operator to the depth image.

The motion extractor 1230 may extract a motion of the depth camera providing the depth image, using the extracted edge.

The pose update unit 1240 may update a depth camera pose with the extracted motion of the depth camera.

Figure 13:
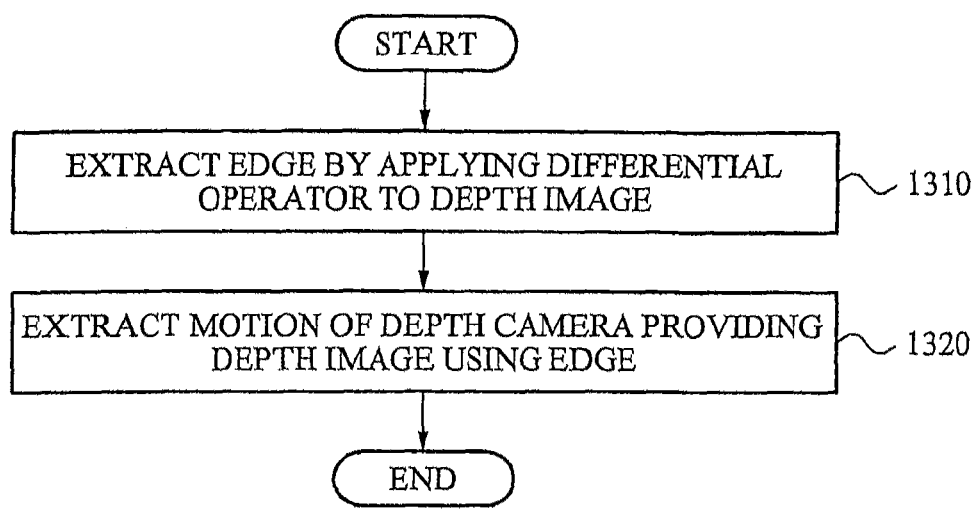
FIG. 13 illustrates a method of estimating a camera motion according to other embodiments.

FIG. 13 illustrates a method of estimating a camera motion according to other embodiments.

In operation 1310, the camera motion estimation apparatus 1200 may extract an edge by applying a differential operator to a depth image. The camera motion estimation apparatus 1200 may extract the edge by capturing the depth image generated from a depth camera, and by applying a first differential operator or a second differential operator to the depth image.

For example, the camera motion estimation apparatus 1200 may extract the edge by applying, to the depth image, a Laplacian operator of applying a Laplacian mask as the second differential operator. The method of extracting the edge using the first differential operator and the second differential operator is described above with reference to Equation 9 and Equation 10 and thus, further detailed description related thereto will be omitted here.

In operation 1320, the camera motion estimation apparatus 1200 may extract a motion of the depth camera providing the depth image, using the edge.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus that estimates camera motion, the apparatus comprising:
   an intersection point extractor configured to extract an intersection point of three planes from plane information, based on at least one of planes, intersection lines, and a plane equation, the plane information being acquired from a point sample of a depth camera providing a depth image;
   a feature point detector configured to calculate a feature point for each plane included in the plane information, using the extracted intersection point;
   a motion extractor configured to extract a motion of the depth camera providing the depth image, using the calculated feature point; and
   an intersection line extractor configured to extract an edge by applying a differential operator to the depth image,
   wherein the motion extractor is configured to extract the motion of the depth camera providing the depth image, using the extracted edge, and
   the intersection point extractor is further configured to
      generate a subset including three elements among elements included in a plane set extracted as the plane information,
      extract three vectors respectively expressing three plane equations within the subset, and
      extract the intersection point using the extracted three vectors.

2. The apparatus of claim 1, further comprising:
   a plane extractor configured to extract the plane information from the depth image.

3. The apparatus of claim 2, wherein the plane extractor is further configured to define a plane set as the plane information by applying, to a cubic equation, a point sample acquired from the depth camera.

4. The apparatus of claim 1, further comprising:
   an intersection line extractor configured to extract an intersection line between two planes included in the plane information.

5. The apparatus of claim 4, wherein the feature point detector is configured to calculate feature points for each of plane included in the plane information, the feature points being spaced apart by a predetermined interval along the extracted intersection line.

6. The apparatus of claim 5, wherein the feature point detector is further configured to calculate the feature points for each plane by adjusting the predetermined interval.

7. The apparatus of claim 1, wherein the motion extractor is further configured to calculate rotation information or translation information between a first depth camera and a second depth camera using a first feature point extracted from the first depth camera and a second feature point extracted from the second depth camera.

8. An apparatus that estimates camera motion, the apparatus comprising:
   an intersection point extractor configured to
      extract a first intersection point of three planes from first plane information, based on at least one of planes, intersection lines, and a plane equation, the first plane information being acquired from a first point sample of a first depth camera providing a first frame, and
      extract a second intersection point of the three planes from second plane information, based on at least one of the planes, the intersection lines, and the plane equation, the second plane information being acquired from a second point sample of a second depth camera providing a second frame;
   a feature point detector configured to
      calculate a first feature point for each plane included in the first plane information, using the first extracted intersection point, and
      calculate a second feature point for each plane included in the second plane information, using the second extracted intersection point;
   a motion extractor configured to extract a motion between the first depth camera and the second depth camera using the first feature point and the second feature point; and
   an intersection line extractor configured to extract an edge by applying a differential operator to the depth image,
   wherein the motion extractor is configured to extract the motion of the depth camera providing the depth image, using the extracted edge, and
   the intersection point extractor is further configured to
      generate a subset including three elements among elements included in a plane set extracted as the plane information,
      extract three vectors respectively expressing three plane equation within the subset, and
      extract the intersection point using the extracted three vectors.

9. The apparatus of claim 1, further comprising:
   a pose update unit configured to update the depth camera pose.

10. The apparatus of claim 8, further comprising:
    a plane extractor configured to
       define a first plane set by applying, to a cubic equation, the first point sample acquired from the first depth camera, and
       define a second plane set by applying, to the cubic equation, the second point sample acquired from the second depth camera.

11. The apparatus of claim 8, further comprising:
    an intersection line extractor configured to extract a first intersection line between two planes included in the first plane information; and
    the intersection point extractor configured to
       generate a first subset including three elements among elements of a first plane set extracted as the first plane information, using the first intersection line,
       extract a first vector expressing three plane equations within the first subset, and extract the intersection point associated with the first frame using the extracted first vector.

12. The apparatus of claim 11, wherein the feature point detector is configured to calculate first feature points for each plane included in the first plane information, the first feature points being spaced apart by a predetermined interval along the extracted first intersection line.

13. A method of estimating a camera motion, the method comprising:
   extracting an intersection point of three planes from plane information, based on at least one of planes, intersection lines, and a plane equation, the plane information being acquired from a point sample of a depth image provided by a depth camera;
   calculating a feature point for each plane included in the plane information, using the extracted intersection point; and
   extracting a motion of the depth camera providing the depth image, using the calculated feature point; and
   extracting an edge by applying a differential operator to the depth image,
   wherein the motion of the depth camera providing the depth image is extracted using the extracted edge, and the intersection point is extracted by
      generating a subset including three elements among elements including in a plane set extracted as the plane information,
      extracting three vectors respectively expressing three plane equations within the subset, and
      extracting the intersection point using the extracted three vectors.

14. The method of claim 13, further comprising:
   defining a plane set as the plane information by applying, to a cubic equation, the point sample that is acquired from the depth camera.

15. The method of claim 13, wherein the extracting comprises:
   extracting an intersection line between two planes included in the plane information;
   generating a subset including i elements using the extracted intersection line, wherein i denotes a number of planes;
   extracting vectors expressing i plane equations within the subset; and
   configuring i (n×n) matrices using the extracted vectors, and extracting the intersection point using the i (n×n) matrices, wherein n denotes a natural number.

16. The method of claim 15, wherein the calculating comprises calculating feature points for each plane included in the plane information, the feature points being spaced apart by a predetermined interval along the extracted intersection line.

17. The method of claim 13, further comprising:
   extracting an edge by applying a differential operator to the depth image,
   wherein the extracting of the motion comprises extracting the motion of the depth camera providing the depth image, using the extracted edge.

18. An apparatus that estimates camera motion, the apparatus comprising:
   an intersection point extractor configured to extract an intersection point of three planes from plane information, based on at least one of planes, an intersection lines, and a plane equation, the plane information being acquired from a point sample of a depth camera providing a depth image;
   a feature point detector configured to calculate a feature point for each plane included in the plane information, using the extracted intersection point;
   an edge extractor configured to extract an edge by applying a first differential operator to a depth image in response to the plane information being absent from the depth image;
   a motion extractor configured to extract a motion of the depth camera providing the depth image, using the calculated feature point or the extracted edge; and
   an intersection line extractor configured to extract an edge by applying a differential operator to the depth image,
   wherein the motion extractor is configured to extract the motion of the depth camera providing the depth image, using the extracted edge, and
   the intersection point extractor is further configured to
      generate a subset including three elements among elements including in a plane set extracted as the plane information,
      extract three vectors respectively expressing three plane equations within the subset, and
      extract the intersection point using the extracted three vectors.

19. The apparatus of claim 18, wherein the edge extractor is further configured to extract the edge by applying a second differential operator to the depth image.

20. The apparatus of claim 18, further comprising:
   a depth image capturing unit configured to capture the depth image.

21. The apparatus of claim 18, further comprising: a pose update unit configured to update a depth camera pose with the extracted motion.

22. The apparatus of claim 18, wherein the differential operator is a gradient operator or a Laplacian operator, and is classified as an x-directional operator or a y-directional operator.

23. The apparatus of claim 18, wherein the edge extractor is further configured to extract the edge by applying a Laplacian operator of applying Laplacian mask, which measures a brightness change amount in the depth image, and extracting a portion of the depth image with a relatively large change.

24. The apparatus of claim 1, wherein $$1 \leq t \leq \frac{n(n-1)(n-2)}{3!},$$

t being a number of subsets of the planes, and $$x_{t,0}^j = -\frac{\begin{bmatrix} d_1 & b_1 & c_1 \\ d_2 & b_2 & c_2 \\ d_3 & b_3 & c_3 \end{bmatrix}}{DET}, \quad y_{t,0}^j = -\frac{\begin{bmatrix} a_1 & b_1 & c_1 \\ a_2 & b_2 & c_2 \\ a_3 & b_3 & c_3 \end{bmatrix}}{DET},$$

$$z_{t,0}^j = -\frac{\begin{bmatrix} a_1 & b_1 & d_1 \\ a_2 & b_2 & d_2 \\ a_3 & b_3 & d_3 \end{bmatrix}}{DET}$$

$(a_1, b_1, c_1, d_1)$, $(a_2, b_2, c_2, d_2)$, and $(a_3, b_3, C_3, d_3)$ being vectors expressing plane equations of a subset of a jth frame, $x_{t,0}^j, y_{t,0}^j, z_{t,0}^j$ being coordinates of the three planes of the jth frame, and $$DET = \begin{vmatrix} a_1 & b_1 & c_1 \\ a_2 & b_2 & c_2 \\ a_3 & b_3 & c_3 \end{vmatrix}.$$

* * * * *